(12) United States Patent
Kosugi et al.

(10) Patent No.: US 9,931,809 B2
(45) Date of Patent: Apr. 3, 2018

(54) COMPOSITE MATERIAL STRUCTURE AND METHOD OF MANUFACTURING COMPOSITE MATERIAL STRUCTURE

(71) Applicant: Fuji Jukogyo Kabushiki Kaisha, Tokyo (JP)

(72) Inventors: Yoshikazu Kosugi, Tokyo (JP); Masakatsu Abe, Tokyo (JP); Yuichiro Yasunaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/259,109

(22) Filed: Sep. 8, 2016

(65) Prior Publication Data

US 2017/0066216 A1 Mar. 9, 2017

(30) Foreign Application Priority Data

Sep. 9, 2015 (JP) ................. 2015-178021

(51) Int. Cl.
   *B32B 5/02* (2006.01)
   *B29C 70/34* (2006.01)
   *B29C 70/00* (2006.01)
   *B29C 65/00* (2006.01)

(52) U.S. Cl.
   CPC .............. *B32B 5/02* (2013.01); *B29C 65/00* (2013.01); *B29C 70/00* (2013.01); *B29C 70/34* (2013.01)

(58) Field of Classification Search
   CPC ........ Y10T 428/195; B32B 5/02; B32B 5/145
   See application file for complete search history.

(56) References Cited

U.S. PATENT DOCUMENTS

| 5,281,454 A | 1/1994 | Hanson |
| 9,120,276 B2 | 9/2015 | Wittenberg |

FOREIGN PATENT DOCUMENTS

| JP | 2001-509749 A | 7/2001 |
| JP | 2014-024334 A | 2/2014 |
| WO | WO 00/09321 A1 | 2/2000 |
| WO | WO 2015/114098 A1 | 8/2015 |
| WO | WO 2015/114100 A1 | 8/2015 |

OTHER PUBLICATIONS

JPO Decision to Grant dated Feb. 14, 2017 with an English translation thereof.
JPO Notification of Refusal dated Dec. 6 2016 (previously submitted on Dec. 22, 2016) with English translation thereof.
Japanese Office Action dated Dec. 6, 2016 in Japanese Application No. 2015-178021.

*Primary Examiner* — Alexander Thomas
(74) *Attorney, Agent, or Firm* — McGinn IP Law Group, PLLC (57) ABSTRACT

According to one implementation, a composite material structure includes a first member and a second member. The first member has at least one first bonded surface. The second member has at least one second bonded surface to be bonded to the at least one first bonded surface. The second member is made of a composite material. At least one surface formed by fibers forming the composite material is used as the at least one second bonded surface by disposing end portions of the fibers, in the first member side, inside the composite material.

13 Claims, 6 Drawing Sheets

COMPOSITE MATERIAL STRUCTURE AND METHOD OF MANUFACTURING COMPOSITE MATERIAL STRUCTURE

CROSS REFERENCES TO RELATED APPLICATIONS

This application is based upon and claims the benefit of priority from Japanese Patent Application No. 2015-178021, filed on Sep. 9, 2015; the entire contents of which are incorporated herein by reference.

FIELD

Implementations described herein relate generally to a composite material structure and a method of manufacturing a composite material structure.

BACKGROUND

Conventionally, a fastener joint that fix parts, which are objects to be joined, with each other by bolts and nuts is known as a method for joining composite materials, such as GFRP (glass fiber reinforced plastics) or CFRP (carbon fiber reinforced plastics), which are used as a material of a part of an aircraft or the like, with each other or a method for joining a composite material with a metal.

However, when fastener joints are required at many places like in a case of a joint of parts of an aircraft with each other, for example, increase in assembly man-hours and increase in the weight of a product are caused.

Thus, a technique using an adhesive joint for joining parts of an aircraft or the like with each other has been devised in expectation of a weight reduction compared with a fastener joint. For example, a scarf joint that cuts parts, which are objects to be joined, obliquely to each other in order to widen joint surfaces has been devised as an adhesive joint (for example, refer to U.S. Pat. No. 5,281,454 A).

A composite material is formed by laminating thin sheets, which are called prepregs and each made of reinforced fibers impregnated in a resin, and subsequently heating and curing the laminated sheets. Therefore, strength of a composite material in a lamination direction is small compared with strength in a direction along surfaces of prepregs.

Thus, a technique to place a metal sheet, such as a titanium sheet, between sheets of prepregs as a reinforcement member in order to secure strength of a composite material in the lamination direction has been devised (for example, refer to Japanese Patent Application Publication JP 2014-024334 A).

An object of the present invention is to further improve strength of an adhesive joint of a composite material.

SUMMARY OF THE INVENTION

In general, according to one implementation, a composite material structure includes a first member and a second member. The first member has at least one first bonded surface. The second member has at least one second bonded surface to be bonded to the at least one first bonded surface. The second member is made of a composite material. At least one surface formed by fibers forming the composite material is used as the at least one second bonded surface by disposing end portions of the fibers, in the first member side, inside the composite material.

Further, according to one implementation, a method of manufacturing a composite material structure includes: producing a laminated body of first prepregs, of which lengths are not same, by laminating the first prepregs to make at least one ends of the first prepregs become inside; producing a laminated body of second prepregs, of which lengths are not same, by laminating the second prepregs to make at least one ends of the second prepregs become inside; and heating and curing an object part to be bonded having two surfaces to be bonded, the laminated body of the first prepregs, and the laminated body of the second prepregs. The laminated body of the first prepregs has a surface to be bonded formed by a surface of one of the first prepregs. The surface to be bonded formed by the surface of the one of the first prepregs inclines to a thickness direction of the laminated body of the first prepregs. The laminated body of the second prepregs has a surface to be bonded formed by a surface of one of the second prepregs. The surface to be bonded formed by the surface of the one of the second prepregs inclines to a thickness direction of the laminated body of the second prepregs. The two surfaces of the object part are surfaces of a projecting convex portion of which section is a wedge shape. The object part to be bonded, the laminated body of the first prepregs, and the laminated body of the second prepregs are combined in a state where the thickness direction of the laminated body of the first prepregs is same as the thickness direction of the laminated body of the second prepregs, the surface to be bonded formed on the laminated body of the first prepregs is matched to one of the two surfaces of the object part and the surface to be bonded formed on the laminated body of the second prepregs is matched to another of the two surfaces of the object part.

Further, according to one implementation, a method of manufacturing a composite material structure includes: producing a laminated body of first prepregs, of which lengths are not same, by laminating the first prepregs to make at least one ends of the first prepregs become inside; producing a laminated body of second prepregs, of which lengths are not same, by laminating the second prepregs to make at least one ends of the second prepregs become inside; producing a first composite component and a second composite component by heating and curing the laminated body of the first prepregs and the laminated body of the second prepregs simultaneously or individually; and bonding an object part to be bonded having two surfaces to be bonded, the first composite component, and the second composite component, with an adhesive. The laminated body of the first prepregs has a surface to be bonded formed by a surface of one of the first prepregs. The surface to be bonded formed by the surface of the one of the first prepregs inclines to a thickness direction of the laminated body of the first prepregs. The laminated body of the second prepregs has a surface to be bonded formed by a surface of one of the second prepregs. The surface to be bonded formed by the surface of the one of the second prepregs inclines to a thickness direction of the laminated body of the second prepregs. The first composite component has a first surface to be bonded. The second composite component has a second surface to be bonded. The two surfaces of the object part are surfaces of a projecting convex portion of which section is a wedge shape. The object part to be bonded, the first composite component, and the second composite component are bonded in a state where a thickness direction of the first composite component is same as a thickness direction of the second composite component, the first surface of the first composite component is matched to one of the two surfaces of the object part and the second surface of the second composite component is matched to another of the two surfaces of the object part.

DETAILED DESCRIPTION

A composite material structure and a method of manufacturing a composite material structure according to implementations of the present invention will be described with reference to the accompanying drawings.

(First Implementation)
(Structure and Function)

Figure 1:
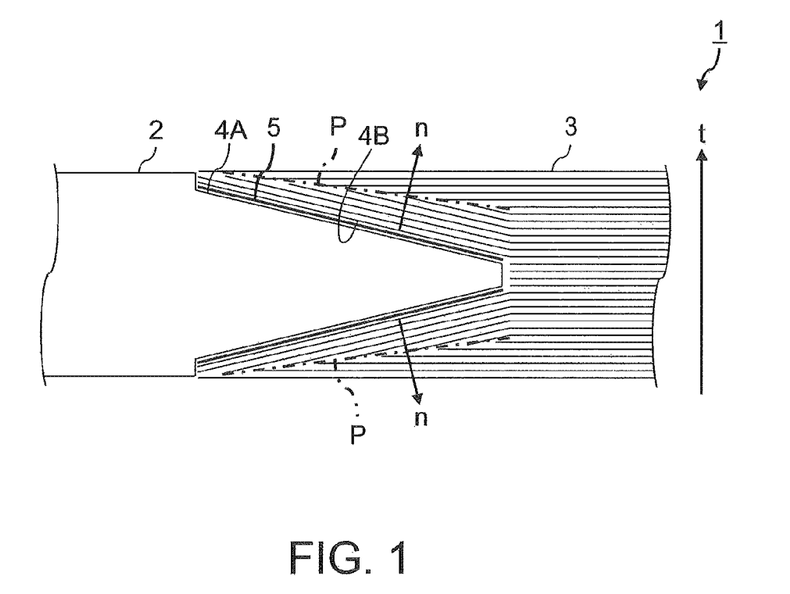
FIG. 1 is a sectional view showing structure of a composite material structure according to the first implementation of the present invention.

FIG. 1 is a sectional view showing structure of a composite material structure according to the first implementation of the present invention.

A composite material structure 1 is composed by jointing the first member 2 with the second member 3 made of a composite material, such as FRP (fiber reinforced plastics). The first member 2 has the first bonded surfaces 4A. Meanwhile, the second member 3 has the second bonded surfaces 4B. Then, the second member 3 is bonded to the first bonded surfaces 4A of the first member 2 at the second bonded surfaces 4B. That is, the first bonded surfaces 4A of the first member 2 and the second bonded surfaces 4B of the second member 3 are bonded to each other.

An adhesive can be used for bonding the first member 2 with the second member 3, as necessary. In the case of bonding the first member 2 with the second member 3 using an adhesive, adhesion layers 5 are formed between the first bonded surfaces 4A of the first member 2 and the second bonded surfaces 4B of the second member 3. Note that, the second member 3 may be bonded to the first member 2 by thermal curing of a composite material without using an adhesive.

The first member 2 is a component made of a metal or the like, to be bonded to the second member 3 made of a composite material. Meanwhile, the second member 3, made of a composite material, is composed by laminating sheet-like fibers.

Specifically, the second member 3 has structure in which sheet-like fibers have been laminated in the thickness direction t of the second member 3 as a whole. Each end portion of the fibers, forming a composite material of the second member 3, in the first member 2 side is disposed inside the composite material. Therefore, the second bonded surfaces 4B of the second member 3 are surfaces of the fibers, respectively. Furthermore, since each end portion of the fibers forming the composite material of the second member 3 is disposed inside the composite material, surfaces of the second member 3 are also surfaces of the fibers, respectively. That is, each end portion of the fibers forming the composite material is not exposed outside, except for a side surface side of the composite material.

In order to dispose each end portion of the fibers, forming the composite material, inside the composite material, what is necessary is to change the lengths of the fibers forming the composite material. In principle, each end portion of the fibers forming the composite material can be avoided to be exposed outside except for the side surface side when one sheet of fibers, forming each of the second bonded surfaces 4B of the second member 3, is laminated in the direction n perpendicular to the second bonded surface 4B while other fibers are laminated in the thickness direction t of the second member 3 with changing the lengths of the fibers. Conversely, each end portion of the fibers forming the composite material can also be avoided to be exposed outside except for the side surface side when one sheet of fibers, forming each surface of the second member 3, is laminated in the thickness direction t of the second member 3 while other fibers are laminated in the directions n perpendicular to the second bonded surfaces 4B with changing the lengths of the fibers.

Note that, from a viewpoint of improving mechanical characteristics, such as strengths of a composite material, it is preferable to laminate parts of fibers, forming the composite material in the first member 2 side and the second bonded surface 4B sides, in the directions n perpendicular to the second bonded surfaces 4B respectively. Meanwhile, it is preferable to laminate the remaining parts of the fibers, forming the composite material in the first member 2 side and sides far from the second bonded surfaces 4B, in the thickness direction t of the second member 3. That is, in the first member 2 side, it is preferable to laminate plural fibers in each of the thickness direction t of the second member 3 and the directions n perpendicular to the second bonded surfaces 4B.

In the example shown in the figure, the first member 2 is a component having a convex portion, projecting so that a section becomes a wedge shape, of which surface forms the first bonded surfaces 4A. Therefore, the second bonded surfaces 4B of the second member 3 are surfaces of two sheets of fibers which have been extended in a shape of V character corresponding to the convex portion of the first member 2. The fibers have been laminated in both of the thickness direction t of the second member 3 and the directions n perpendicular to the second bonded surfaces 4B. Therefore, each end portion of fibers, in the surface sides of the second member 3, laminated in the thickness direction t of the second member 3 and each end portion of fibers, in the first member 2 side, laminated in the directions n perpendicular to the second bonded surfaces 4B are disposed on the planes P which incline relative to the thickness direction t of the second member 3.

Thus, in order to produce the second member 3 exemplified in FIG. 1, what is necessary is to laminate fibers having different lengths so that two concaves having shapes of V character are formed at the end portion in the first member 2 side and subsequently to press the laminated fibers against upper and lower fibers, with near the center of the thickness direction t of the second member 3 as the boundary. That is, what is necessary is to spread fibers, which are long in lengths near the center of the thickness direction t, toward the outside, and use surfaces of the two sheets of the spread fibers as the second bonded surfaces 4B of the second member 3.

A joint method in which a bonded surface of two objects inclines relative to the thickness direction is called a scarf joint. Therefore, it can be said that a joint method of the first member 2 and the second member 3 bonded through two inclining surfaces, as exemplified in FIG. 1 is a type of a scarf joint.

The composite material structure 1 including the first member 2 and the second member 3 which have been bonded to each other by the above-mentioned scarf joint can be used as a structural object for an aircraft, for example. As a specific example, a panel consisting of a composite material and metallic ribs in the fuselage side can be bonded to each other by a scarf joint as shown in FIG. 1. As a matter of course, in the case of coupling a part, such as a spar or a stringer, to another part, a scarf joint as exemplified in FIG. 1 can also be adopted.

Note that, structures of the first member 2 and the second member 3 can be preferably determined depending on an object to which the composite material structure 1 is applied. For example, the first member 2 and the second member 3 may also be platy members, block members, or bar-shaped members, respectively.

(Effects)

The composite material structure 1 in which both of the second bonded surfaces 4B of the second member 3 and surfaces of the second member 3 are surfaces of fibers as shown in FIG. 1 allows further improving strengths of a scarf joint which is considered to be ideal in an adhesion joint.

Figure 2:
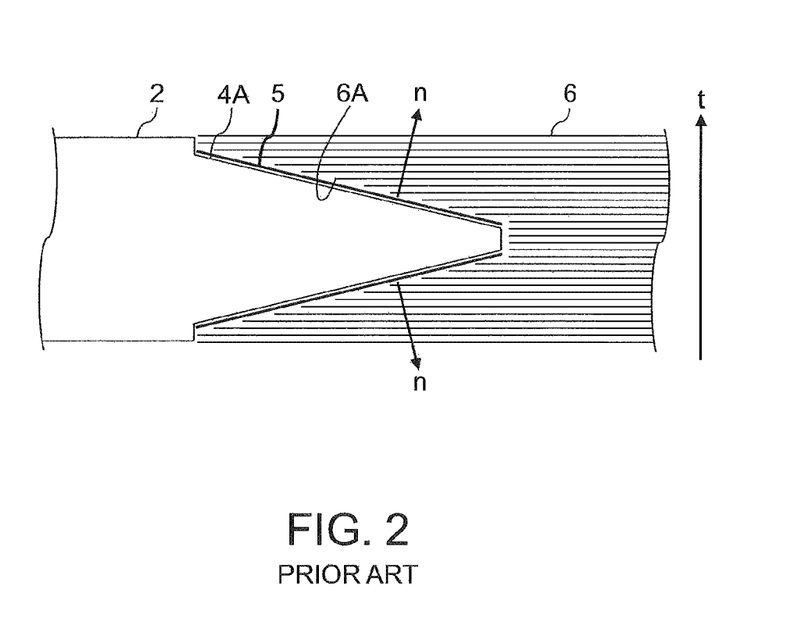
FIG. 2 is a sectional view showing an example of jointing the first member shown in FIG. 1 with a member whose appearance is similar to that of the second member shown in FIG. 1, by a simple scarf joint.

FIG. 2 is a sectional view showing an example of jointing the first member 2 shown in FIG. 1 with a member 6 whose appearance is similar to that of the second member 3 shown in FIG. 1, by a simple scarf joint.

In the case of the conventional member 6, a lamination direction of all fibers of a composite material forming the second member 3 is the thickness direction t of the second member 3, as shown in FIG. 2. In this case, it is necessary to gradually reduce the thickness of the member 6 by displacing positions of fibers for every layer (ply) as shown in FIG. 2. In this case, the bonded surface 6A of the member 6 is formed by end portions of the fibers. Therefore, a substantial adhesion area of the fibers between the member 6 and the first member 2 becomes small. As a result, load transfer ability as a joint between the member 6 and the first member 2 deteriorates. That is, a bonded surface formed by end portions of fibers has low load transfer ability.

Figure 3:
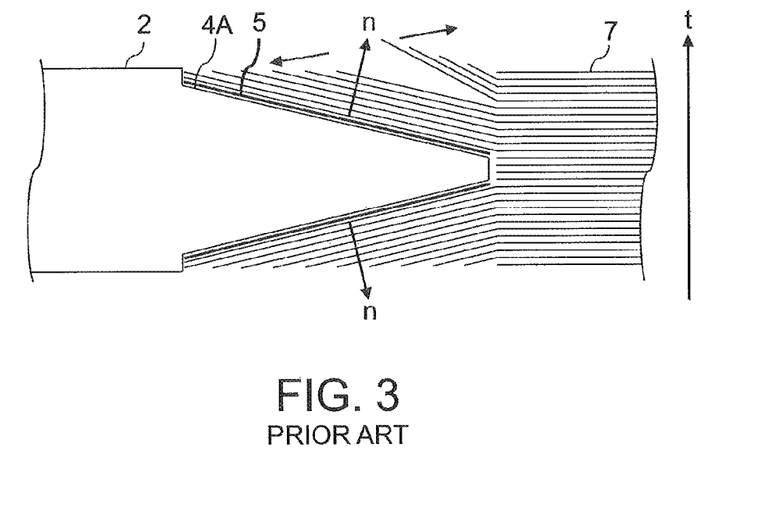
FIG. 3 is a sectional view showing another example of jointing the first member shown in FIG. 1 with a member whose appearance is similar to that of the second member shown in FIG. 1, by a simple scarf joint.

FIG. 3 is a sectional view showing another example of jointing the first member 2 shown in FIG. 1 with a member 7 whose appearance is similar to that of the second member 3 shown in FIG. 1, by a simple scarf joint.

Meanwhile, as shown in FIG. 3, the lamination direction of fibers can also be directions perpendicular to bonded surfaces of the member 7 in order to form the bonded surfaces of the member 7 by surfaces of the fibers, respectively. However, end portions of the fibers are to be disposed on surfaces of the member 7 in this case. As a result, when bending has been applied or damage has occurred on a joint portion, peeling of the fibers or delamination between fiber layers easily occurs starting from the end portions of the fibers.

By contrast, in the case of the composite material structure 1 shown in FIG. 1, the lamination direction of fibers has been determined so that end portions of the fibers are not disposed on the second bonded surfaces 4B and surfaces of the second member 3. Therefore, the above-mentioned negative effects do not occur. Specifically, both of the second bonded surfaces 4B of the second member 3 and surfaces of the second member 3 can be surfaces of fibers by disposing end portions of the fibers inside. As a result, peeling of fibers and/or delamination can be prevented with improving load transfer ability and strengths by securing an effective adhesion area between the second member 3 and the first member 2.

In particular, in a scarf joint, of which bonding target is a composite material having structure in which fiber layers have been laminated, a bonded area equivalent to that of a step joint which forms a stepwise bonded surface or that of a lap joint for piping, in which an outer surface of a cylinder is a bonded surface can be secured. The step joint is a joint method aiming to secure a bonded area of a laminated body. The scarf joint is superior to the step joint from a viewpoint of uniformizing a transmitted load. Therefore, it can be said that the scarf joint exemplified in FIG. 1 has advantages of conventional joint methods.

(Manufacturing Method)

Next, a method of manufacturing the composite material structure 1 will be described.

Figure 4:
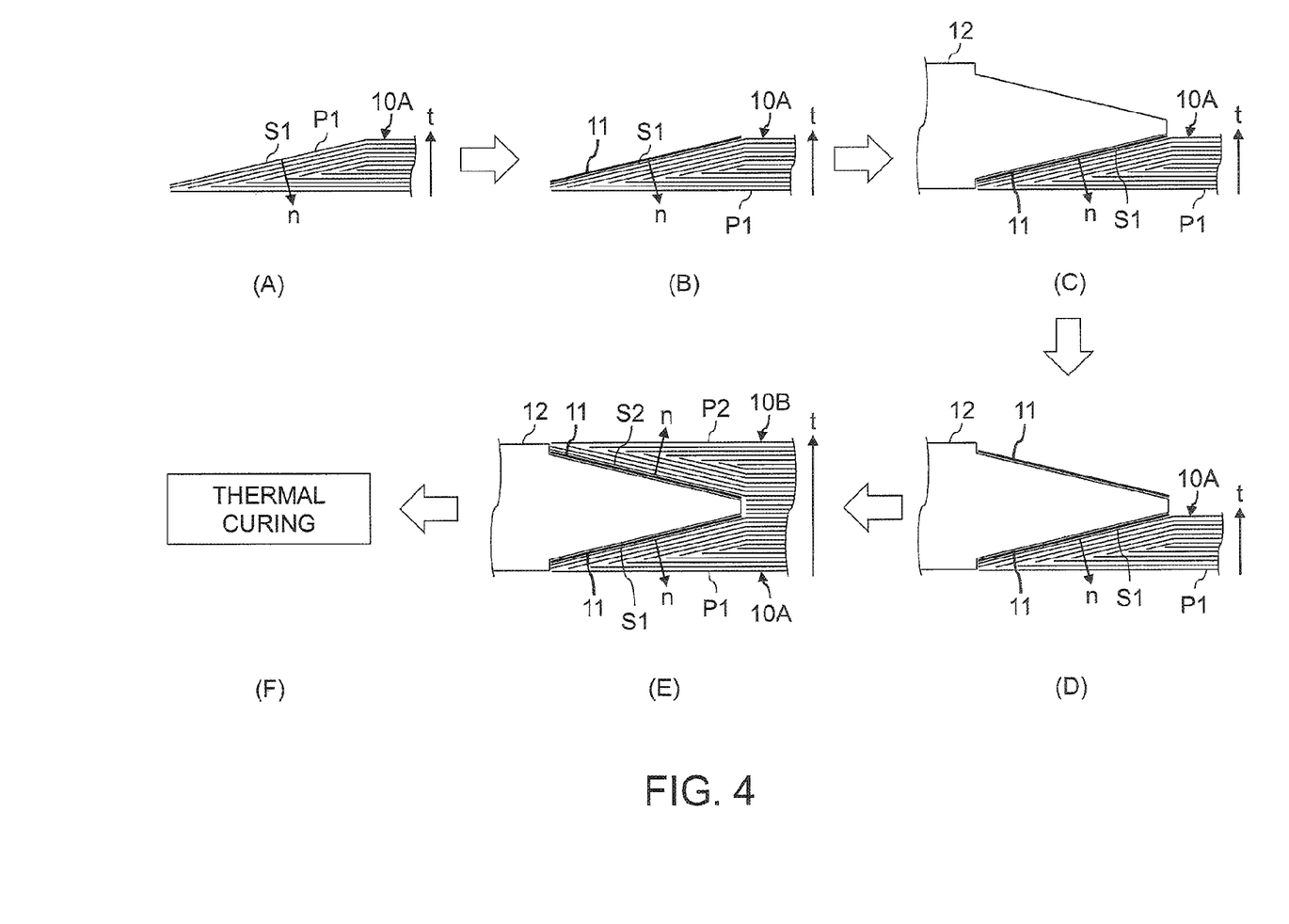
FIG. 4 illustrates the first method of manufacturing the composite material structure shown in FIG. 1.

FIG. 4 illustrates the first method of manufacturing the composite material structure 1 shown in FIG. 1.

Firstly, as shown in (A), a laminated body 10A of the first prepregs P1 is produced. The laminated body 10A of the first prepregs P1 has a surface S1 to be bonded which inclines relative to the thickness direction t and has been formed by a surface of the first prepregs P1. The laminated body 10A of the first prepregs P1 can be produced by laminating the first prepregs P1 whose lengths are not same so that at least each one end becomes inside.

Next, as shown in (B), an adhesive 11 is applied to the surface S1 to be bonded of the laminated body 10A of the first prepregs P1 as necessary. Alternatively, a sheet-like adhesive 11 is disposed.

Next, as shown in (C), an object part 12 to be bonded is disposed on the laminated body 10A of the first prepregs P1, as the first member 2. The convex portion projects so that a section becomes a wedge shape. The object part 12 to be bonded has a convex portion of which surface forms two surfaces to be bonded. Specifically, the laminated body 10A of the first prepregs P1 is combined with the object part 12 to be bonded so that the surface S1 to be bonded formed on the laminated body 10A of the first prepregs P1 is set to one surface to be bonded of the object part 12 to be bonded.

Next, as shown in (D), an adhesive 11 is applied to the other surface to be bonded of the object part 12 to be bonded as necessary. Alternatively, a sheet-like adhesive 11 is disposed.

Next, as shown in (E), a laminated body 10B of the second prepregs P2 is produced. The laminated body 10B of the second prepregs P2 has a surface S2 to be bonded which inclines relative to the thickness direction t and has been formed by a surface of the second prepregs P2. The laminated body 10B of the second prepregs P2 can be produced by laminating the second prepregs P2 whose lengths are not same so that at least each one end becomes inside.

The second prepregs P2 are laminated on the laminated body 10A of the first prepregs P1 and the object part 12 to be bonded, which have been combined with each other. As a result, the object part 12 to be bonded, the laminated body 10A of the first prepregs P1, and the laminated body 10B of the second prepregs P2 are combined. The thickness direction of the laminated body 10A of the first prepregs P1 and the thickness direction of the laminated body 10B of the second prepregs P2 become the same direction. The surface S2 to be bonded formed on the laminated body 10B of the second prepregs P2 is set to the other surface to be bonded of the object part 12 to be bonded.

Next, as shown in (F), the object part 12 to be bonded, the laminated body 10A of the first prepregs P1, and the laminated body 10B of the second prepregs P2, which have been combined so that the surface S1 to be bonded formed on the laminated body 10A of the first prepregs P1 is set to one surface to be bonded of the object part 12 to be bonded while the surface S2 to be bonded formed on the laminated body 10B of the second prepregs P2 is set to the other surface to be bonded of the object part 12 to be bonded, are heated and cured by autoclave molding.

The composite material structure 1 exemplified in FIG. 1 can be manufactured by the above-mentioned manufacturing process. That is, the manufacturing method shown in FIG. 4 is a method for manufacturing the composite material structure 1 by combining the first member 2 with prepregs which are a material of the second member 3, and subsequently, heating and curing the combined first member 2 and the prepregs integrally.

Meanwhile, the composite material structure 1 can also be manufactured by bonding the first member 2 and the second member 3 with an adhesive after intermediately curing or thermally curing the second member 3. When there are two adhesion surfaces like the scarf joint shown in FIG. 1, it is preferable to divide the second member 3 into two portions for thermally curing, from a viewpoint of certainly setting the first surfaces 4A to be bonded of the first member 2 to the second surfaces 4B to be bonded of the second member 3, respectively. In the case of intermediately curing the second member 3, the second member 3 is finally cured after bonding the first member 2 and the second member 3 with an adhesive.

Figure 5:
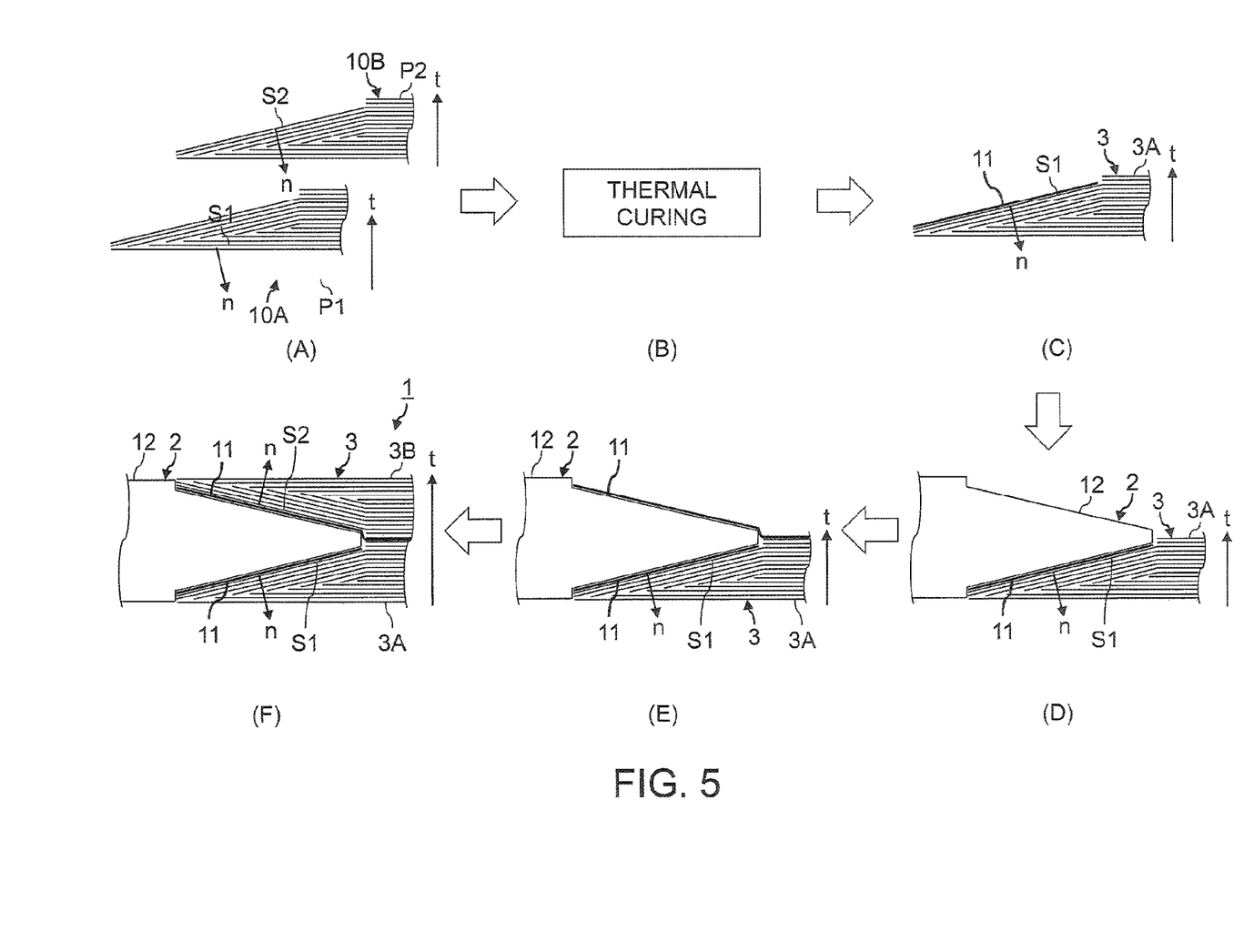
FIG. 5 illustrates the second method of manufacturing the composite material structure shown in FIG. 1.

FIG. 5 illustrates the second method of manufacturing the composite material structure 1 shown in FIG. 1.

Firstly, as shown in (A), a laminated body 10A of the first prepregs P1 is produced. The laminated body 10A of the first prepregs P1 has a surface S1 to be bonded which inclines relative to the thickness direction t and has been formed by a surface of the first prepregs P1. Similarly, a laminated body 10B of the second prepregs P2 is produced. The laminated body 10B of the second prepregs P2 has a surface S2 to be bonded which inclines relative to the thickness direction t and has been formed by a surface of the second prepregs P2.

The laminated body 10A of the first prepregs P1 can be produced by laminating the first prepregs P1 whose lengths are not same so that at least each one end becomes inside. Similarly, the laminated body 10B of the second prepregs P2 can be produced by laminating the second prepregs P2 whose lengths are not same so that at least each one end becomes inside.

Next, as shown in (B), the laminated body 10A of the first prepregs P1 and the laminated body 10B of the second prepregs P2 are heated and cured simultaneously or individually by autoclave molding. Thereby, the first composite component and the second composite component, each of which has a surface to be bonded, are produced. When both of the laminated body 10A of the first prepregs P1 and the laminated body 10B of the second prepregs P2 can be carried into autoclave equipment, it is efficient to heat and cure the laminated body 10A of the first prepregs P1 and the laminated body 10B of the second prepregs P2 simultaneously.

Next, as shown in (C), an adhesive 11 is applied to the surface S1 to be bonded of the first composite component 3A. Alternatively, a sheet-like adhesive 11 is disposed.

Next, as shown in (D), an object part 12 to be bonded is disposed on the first composite component 3A, as the first member 2. The object part 12 to be bonded has a convex portion whose surface forms two surfaces to be bonded. The convex portion projects so that a section becomes a wedge shape. Specifically, the first composite component 3A is combined with the object part 12 to be bonded so that the surface S1 to be bonded of the first composite component 3A is set to one surface to be bonded of the object part 12.

Next, as shown in (E), an adhesive 11 is applied to the other surface to be bonded of the object part 12. Alternatively, a sheet-like adhesive 11 is disposed.

Next, as shown in (F), the second composite component 3B is combined on the first composite component 3A and the object part 12 to be bonded, which have been combined with each other. Thereby, the object part 12 to be bonded, the first composite component 3A, and the second composite component 3B are bonded to each other with the adhesive 11 so that the thickness direction of the first composite component 3A and the thickness direction of the second composite component 3B become the same direction, and the surface S1 to be bonded of the first composite component 3A is set to one surface to be bonded of the object part 12 to be bonded while the surface S2 to be bonded of the second composite component 3B is set to the other surface to be bonded of the object part 12 to be bonded.

The composite material structure 1 exemplified in FIG. 1 can be manufactured by the above-mentioned manufacturing process. The bonded object part 12, the first composite component 3A, and the second composite component 3B are heated in order to melt the adhesive 11 as necessary.

(Second Implementation)

Figure 6:
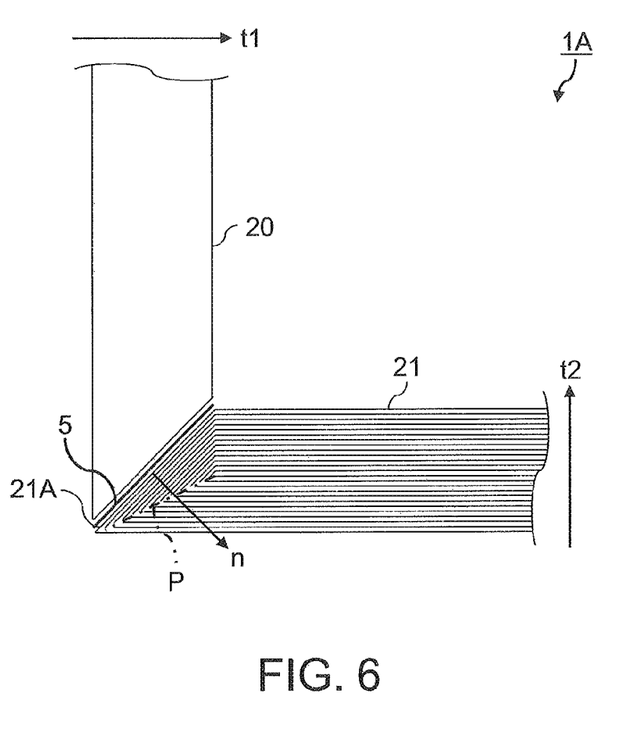
FIG. 6 is a sectional view showing structure of a composite material structure according to the second implementation of the present invention.

FIG. 6 is a sectional view showing structure of a composite material structure according to the second implementation of the present invention.

A composite material structure 1A in the second implementation shown in FIG. 6 is different from the composite material structure 1 in the first implementation in a point that the thickness direction t1 of the first member 20 is different from the thickness direction t2 of the second member 21. Other structures and functions of the composite material structure 1A in the second implementation are not substantially different from those of the composite material structure 1 in the first implementation. Therefore, the same structures or corresponding structures are shown by the same signs, and their explanations are omitted.

Specifically, even when the thickness direction t1 of the first member 20 is different from the thickness direction t2 of the second member 21 as exemplified in FIG. 6, each end portion of fibers in the first member 20 side can also be similarly formed inside the second member 21. Thereby, each of surfaces of the second member 21 and a bonded surface 21A of the second member 21 can be a surface of fibers.

As a matter of course, not only limited to the L-shaped joint as exemplified in FIG. 6, but also a joint bonded at a desired angle can adopt similar structure.

(Third Implementation)

Figure 7:
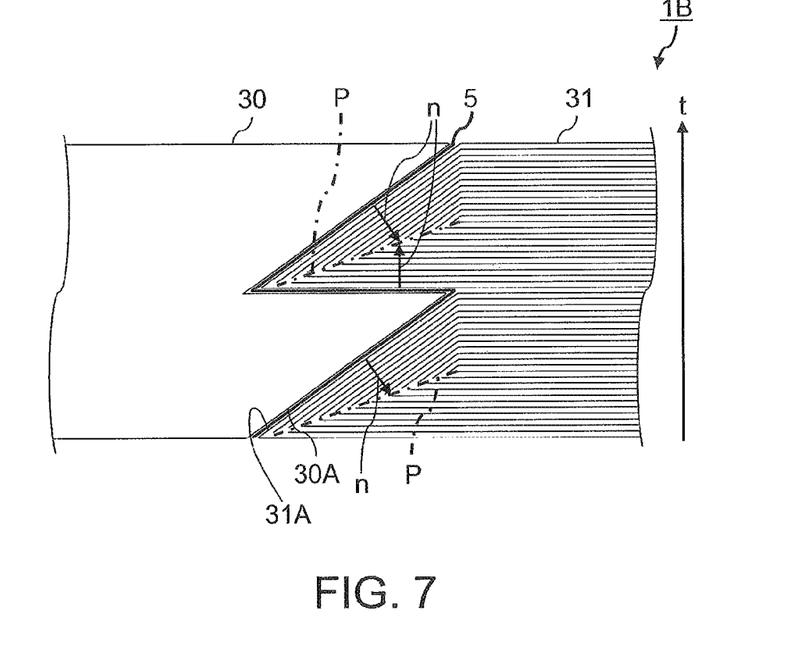
FIG. 7 is a sectional view showing structure of a composite material structure according to the third implementation of the present invention.

FIG. 7 is a sectional view showing structure of a composite material structure according to the third implementation of the present invention.

A composite material structure 1B in the third implementation shown in FIG. 7 is different from the composite material structure 1 in the first implementation in a point that positions of the first bonded surface 30A of the first member 30 and the second bonded surface 31A of the second member 31 are repeated regularly. Other structures and functions of the composite material structure 1B in the third implementation are not substantially different from those of the composite material structure 1 in the first implementation. Therefore, the same structures or corresponding structures are shown by the same signs, and their explanations are omitted.

As exemplified in FIG. 7, positions and shapes of the first bonded surface 30A of the first member 30 and the second bonded surface 31A of the second member 31 can be determined preferably. Therefore, not only limited to the example shown in FIG. 7 but also a step joint can adopt similar structure. In particular, when each thickness of the first member 30 and the second member 31 is large compared with the thickness of fibers, each shape of the first bonded surface 30A of the first member 30 and the second bonded surface 31A of the second member 31 can be a shape which repeats a simple shape regularly, as exemplified in FIG. 7.

(Fourth Implementation)

Figure 8:
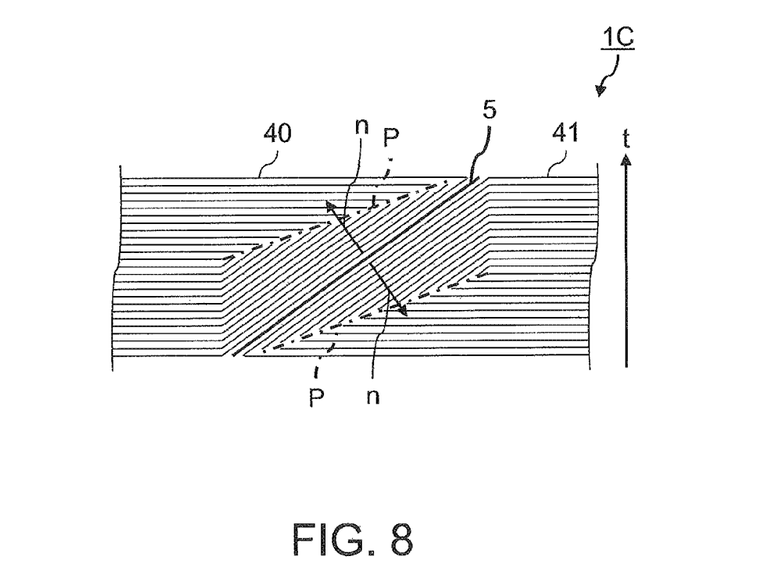
FIG. 8 is a sectional view showing structure of a composite material structure according to the fourth implementation of the present invention.

FIG. 8 is a sectional view showing structure of a composite material structure according to the fourth implementation of the present invention.

A composite material structure 1C in the fourth implementation shown in FIG. 8 is different from the composite material structure 1 in the first implementation in a point that each of the first member 40 and the second member 41 is made of a composite material. Other structures and functions of the composite material structure 1C in the fourth implementation are not substantially different from those of the composite material structure 1 in the first implementation. Therefore, the same structures or corresponding structures are shown by the same signs, and their explanations are omitted.

When the first member 40 is a composite material, as shown in FIG. 8, similar structure can also be adopted. When the first member 40 is a composite material, the first member 40 and the second member 41 can be bonded by a simple scarf joint by disposing the first member 40 and the second member 41 spatially line-symmetrically, as exemplified in FIG. 8. As a matter of course, a scarf joint having plane-symmetrical two bonded surfaces as exemplified in FIG. 1 can also be adopted. In that case, what is necessary is to dispose each end portion of fibers, forming the first member 2, at the center of a wedge-shaped convex portion.

Similarly, each of the first member 20 in the second implementation and the first member 30 in the third implementation may also be made of a composite material.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A composite material structure comprising:
a first member having at least one first bonded surface including a surface of a projecting convex portion, a section of the convex portion being a wedge shape; and
a second member having at least one second bonded surface to be bonded to the at least one first bonded surface, the second member being made of a composite material,
wherein end portions of sheet-like fibers forming the composite material are disposed inside the composite material by spreading a part of the sheet-like fibers in a V-shape corresponding to the convex portion and laminating the spread part of the sheet-like fibers on the at least one second bonded surface in directions perpendicular to the at least one second bonded surface, the end portions of the sheet-like fibers being formed on a side of the first member.

2. The composite material structure according to claim 1, wherein lengths of the sheet-like fibers forming the composite material are changed, and a lamination direction of a part of the sheet-like fibers forming the composite material is perpendicular to the at least one second bonded surface while a lamination direction of another part of the sheet-like fibers forming the composite material is a thickness direction of the second member, and the part of the sheet-like fibers being formed on a side of the first member and on the at least one second bonded surface, and the another part of the sheet-like fibers being formed on a side of the first member and separated from the at least one second bonded surface, the first member and the second member being platy.

3. A composite material structure comprising:
a first member having at least one first bonded surface, the first member being made of a metal; and
a second member having at least one second bonded surface to be bonded to the at least one first bonded surface, the second member being made of a composite material,
wherein end portions of sheet-like fibers forming the composite material are disposed inside the composite material by laminating a part of the sheet-like fibers on the at least one second bonded surface in a direction perpendicular to the at least one second bonded surface, the end portions of the sheet-like fibers being formed on a side of the first member.

4. The composite material structure according to claim 3, wherein the first member is jointed to the second member by a scarf joint.

5. The composite material structure according to claim 4, wherein the at least one first bonded surface includes a surface of a projecting convex portion, a section of the convex portion being a wedge shape; and
the second member includes two sheets of sheet-like fibers, the two sheets being spread in a V-shape corresponding to the convex portion.

6. The composite material structure according to claim 3, wherein the at least one first bonded surface includes a surface of a projecting convex portion, a section of the convex portion being a wedge shape; and
the second member includes two sheets of sheet-like fibers, the two sheets being spread in a V-shape corresponding to the convex portion.

7. The composite material structure according to claim 3, wherein lengths of the sheet-like fibers forming the composite material are changed, and a lamination direction of a part of the sheet-like fibers forming the composite material is perpendicular to the at least one second bonded surface while a lamination direction of another part of the sheet-like fibers forming the composite material is a thickness direction of the second member, the part of the sheet-like fibers being formed on a side of the first member and on the at least one second bonded surface, and the another part of the sheet-like fibers being formed on a side of the first member and separated from the at least one second bonded surface, the first member and the second member being platy.

8. A method of manufacturing a composite material structure comprising:
producing a platy laminated body of first prepregs, of which lengths are not same, by laminating the first prepregs to make at least one ends of the first prepregs become inside, the laminated body of the first prepregs having a surface to be bonded formed by a surface of one of the first prepregs, the surface to be bonded formed by the surface of the one of the first prepregs inclining to a thickness direction of the laminated body of the first prepregs;
producing a platy laminated body of second prepregs, of which lengths are not same, by laminating the second prepregs to make at least one ends of the second prepregs become inside, the laminated body of the second prepregs having a surface to be bonded formed by a surface of one of the second prepregs, the surface to be bonded formed by the surface of the one of the second prepregs inclining to a thickness direction of the laminated body of the second prepregs; and
heating and curing an object part to be bonded having two surfaces to be bonded, the laminated body of the first prepregs, and the laminated body of the second prepregs, which have been combined in a state where the thickness direction of the laminated body of the first prepregs is same as the thickness direction of the laminated body of the second prepregs, the surface to be bonded formed on the laminated body of the first prepregs is matched to one of the two surfaces of the object part and the surface to be bonded formed on the laminated body of the second prepregs is matched to another of the two surfaces of the object part, the two surfaces of the object part being surfaces of a projecting convex portion of which section is a wedge shape,
wherein the object to be bonded constitutes a first member;
wherein the platy laminated body of first prepregs and the platy laminated body of second prepregs constitute a second member being made of a composite material, and
wherein the first and second prepregs comprise sheet-like fibers, and end portions of the sheet-like fibers form the composite material and are disposed inside the composite material by spreading a part of the sheet-like fibers in a V-shape corresponding to the convex portion and laminating the spread part of the sheet-like fibers on the two surfaces to be bonded in directions perpendicular to the two surfaces to be bonded, the end portions of the sheet-like fibers being formed on a side of the first member.

9. A method of manufacturing a composite material structure comprising:
producing a platy laminated body of first prepregs, of which lengths are not same, by laminating the first prepregs to make at least one ends of the first prepregs become inside, the laminated body of the first prepregs having a surface to be bonded formed by a surface of one of the first prepregs, the surface to be bonded formed by the surface of the one of the first prepregs inclining to a thickness direction of the laminated body of the first prepregs;
producing a platy laminated body of second prepregs, of which lengths are not same, by laminating the second prepregs to make at least one ends of the second prepregs become inside, the laminated body of the second prepregs having a surface to be bonded formed by a surface of one of the second prepregs, the surface to be bonded formed by the surface of the one of the second prepregs inclining to a thickness direction of the laminated body of the second prepregs;
producing a platy first composite component and a platy second composite component by heating and curing the laminated body of the first prepregs and the laminated body of the second prepregs simultaneously or individually, the first composite component having a first surface to be bonded, the second composite component having a second surface to be bonded; and
bonding an object part to be bonded having two surfaces to be bonded, the first composite component, and the second composite component, with an adhesive, in a state where a thickness direction of the first composite component is same as a thickness direction of the second composite component, the first surface of the first composite component is matched to one of the two surfaces of the object part and the second surface of the second composite component is matched to another of the two surfaces of the object part, the two surfaces of the object part being surfaces of a projecting convex portion of which section is a wedge shape,
wherein the object part to be bonded constitutes a first member;
wherein the platy first composite component and the platy second composite component constitute a second member being made of a composite material, and
wherein the first and second prepregs comprise sheet-like fibers, and end portions of the sheet-like fibers form the composite material and are disposed inside the composite material by spreading a part of the sheet-like fibers in a V-shape corresponding to the convex portion and laminating the spread part of the sheet-like fibers on the two surfaces to be bonded in directions perpendicular to the two surfaces to be bonded, the end portions of the sheet-like fibers being formed on a side of the first member.

10. A composite material structure comprising:
a platy first member having at least one first bonded surface; and
a platy second member having at least one second bonded surface to be bonded to the at least one first bonded surface, the second member being made of a composite material,
wherein end portions of sheet-like fibers forming the composite material are disposed inside the composite material by laminating a part of the sheet-like fibers on the at least one second bonded surface in a direction perpendicular to the at least one second bonded surface, the end portions of the sheet-like fibers being formed on a side of the first member;
lengths of the sheet-like fibers forming the composite material are changed, and a lamination direction of the part of the sheet-like fibers forming the composite material is perpendicular to the at least one second bonded surface while a lamination direction of another part of the sheet-like fibers forming the composite material is a thickness direction of the second member, the part of the sheet-like fibers being formed on a side of the first member and on the at least one second bonded surface, and the another part of the sheet-like fibers being formed on a side of the first member and separated from the at least one second bonded surface; and end portions of the another part of the sheet-like fibers laminated in the thickness direction of the second member and end portions of the part of the sheet-like fibers laminated in the direction perpendicular to the at least one second bonded surface are disposed on a plane inclining to the thickness direction of the second member.

11. The composite material structure according to claim 10,
wherein the first member is jointed to the second member by a scarf joint.

12. The composite material structure according to claim 11,
wherein the at least one first bonded surface includes a surface of a projecting convex portion, a section of the convex portion being a wedge shape; and
the second member includes two sheets of sheet-like fibers, the two sheets being spread in a V-shape corresponding to the convex portion.

13. The composite material structure according to claim 10,
wherein the at least one first bonded surface includes a surface of a projecting convex portion, a section of the convex portion being a wedge shape; and
the second member includes two sheets of sheet-like fibers, the two sheets being spread in a V-shape corresponding to the convex portion.

* * * * *